Figure 1:
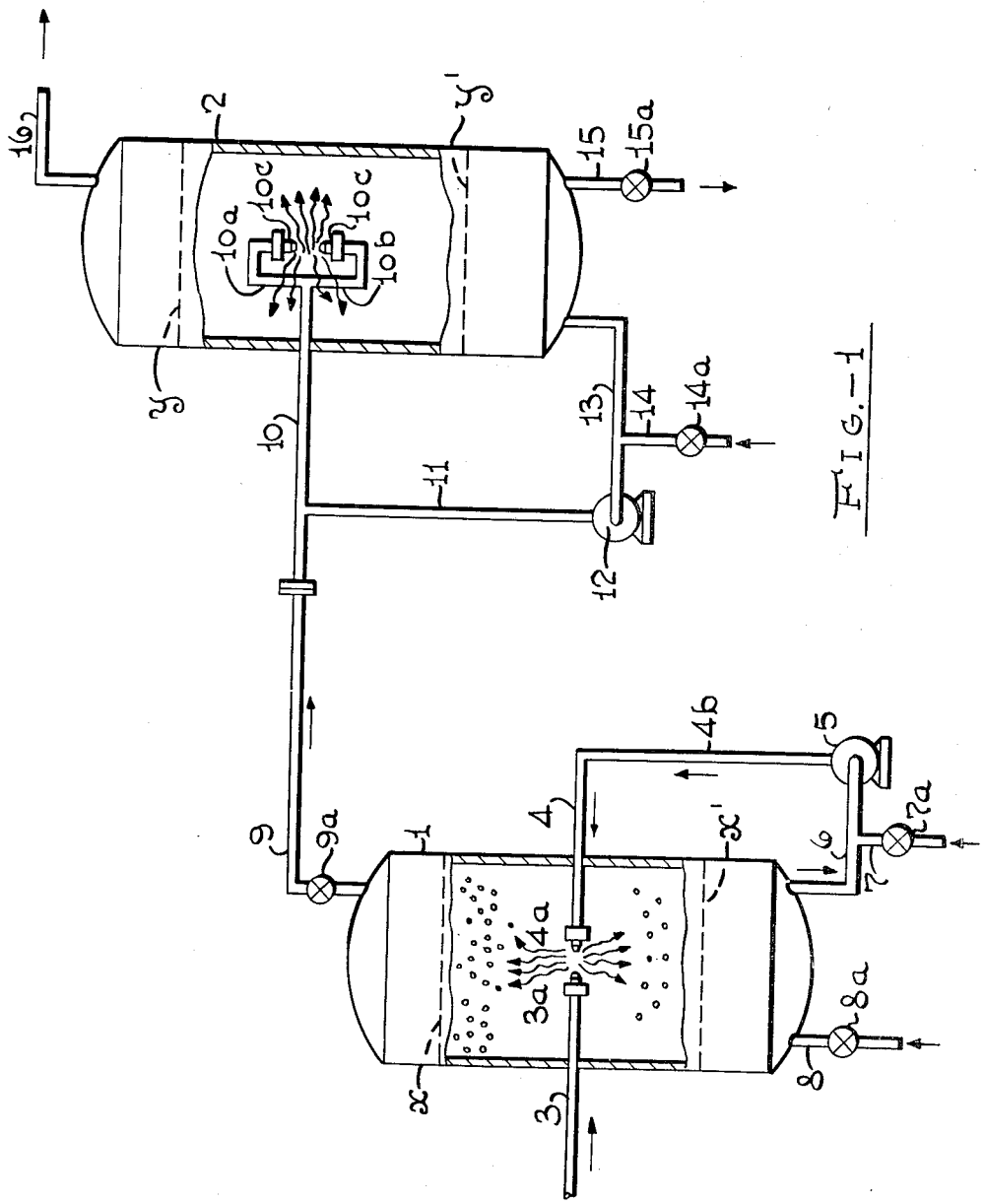

June 19, 1956 J. A. CARVER ET AL 2,751,335
METHOD AND APPARATUS FOR MIXING AND CONTACTING FLUIDS
Filed Feb. 1, 1951 2 Sheets-Sheet 1

John A. Carver
Walter F. Rollman  Inventors
By W. O. Hilman  Attorney

June 19, 1956  J. A. CARVER ET AL  2,751,335
METHOD AND APPARATUS FOR MIXING AND CONTACTING FLUIDS
Filed Feb. 1, 1951  2 Sheets-Sheet 2
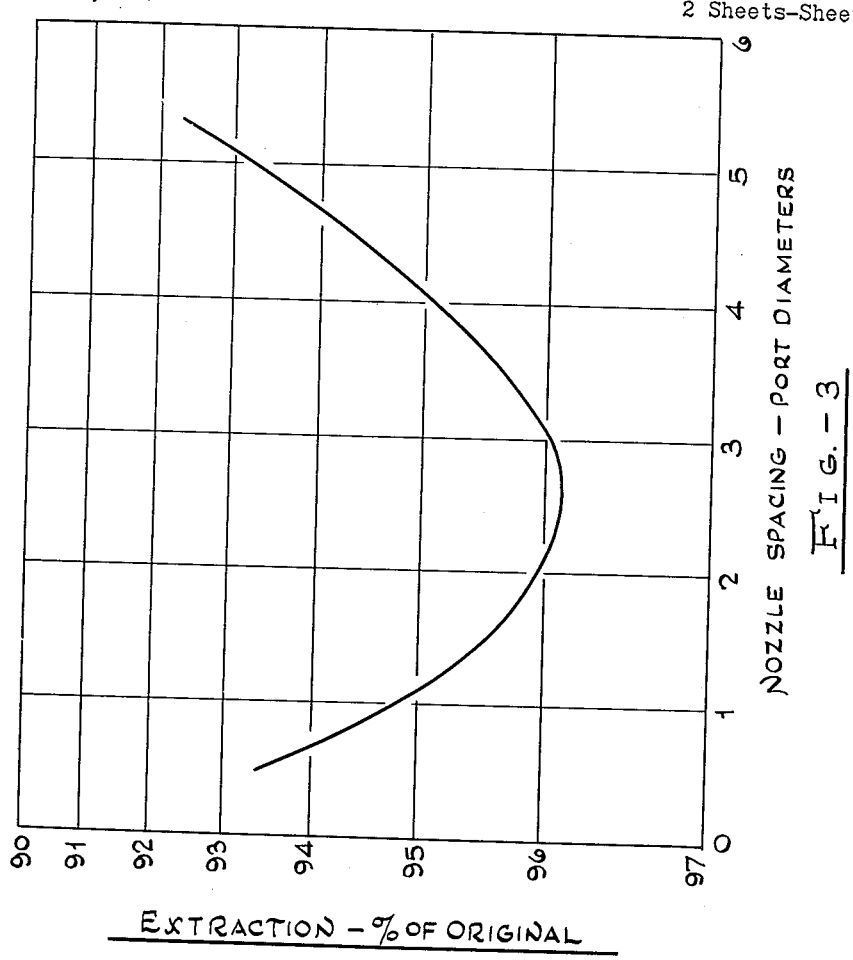
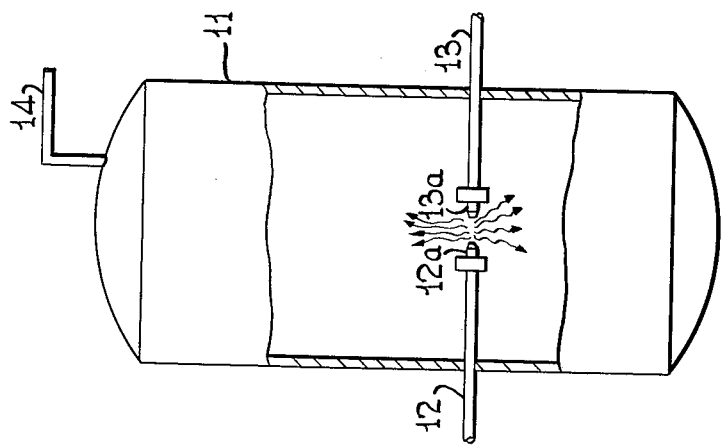
John A. Carver
Walter F. Rollman  Inventors
By W. O. T. Heilman  Attorney

United States Patent Office 2,751,335
Patented June 19, 1956

2,751,335

METHOD AND APPARATUS FOR MIXING AND CONTACTING FLUIDS

John A. Carver, Scotch Plains, and Walter F. Rollman, Cranford, N. J., assignors to Esso Research and Engineering Company, a corporation of Delaware Application February 1, 1951, Serial No. 208,952

5 Claims. (Cl. 196—147)

The present invention relates to methods and apparatus for mixing or contacting liquid or liquefied materials one with another. According to this invention, the liquid materials handled may be miscible or immiscible including mixtures of two or more such materials, and may contain normally gaseous materials dissolved or otherwise combined therein, as well as finely divided solid materials suspended in a liquid medium. The invention also contemplates a system for bringing such materials into intimate contact by mixture or dispersion for any desired purpose, including the absorption or solution of one material in another, the formation of emulsions, and contact for the purpose of bringing about chemical reaction between two or more materials alone or in the presence of catalyst materials. More particularly, the invention relates to a system in which the materials to be contacted are introduced into a mixing or contacting zone as opposed jets thereof by way of opposed jet discharge conduits disposed so as to be submerged in a body of the discharged materials maintained as a liquid pool thereof in a mixing or contacting zone.

Various methods and means have been devised in the past for the preparation of intimate mixtures of two or more liquids, or of a liquid with a gas, in which the materials have been forced under pressure through jets of restricted internal diameter into a body of the materials being mixed or contacted. A common procedure has been to force such materials through single orifices at velocities of from 3 to 100 ft. per second. In such systems, energy consumption tends to be excessive, and the mixing or contacting achieved may be inefficient due to the tendency for the jetted streams of material to retain their individual identities, thereby creating dead spots in the body of materials into which they are discharged. To overcome these conditions, it has been proposed that opposed jets be employed.

It is an object of the present invention to provide a method and apparatus which will produce intimate mixtures and fine grained dispersions of the materials to be brought into contact and to increase the intimacy of contact as compared with what has been obtainable heretofore. It is a further object of the invention to jet the materials to be mixed or contacted through opposed jets with substantially the same kinetic energy, contact between the jetted streams being accomplished at a point intermediate the points of introduction in the opposed jets. It is also an object of the invention to provide a method and means for contacting liquid materials in a confined chamber or zone to obtain intimate mixing or dispersion of the materials therein by causing the jetted streams to impinge within the pool in a plane perpendicular to the axis of the jets and thereby to facilitate heat dispersion into the liquid pool, and to reduce the possible formation of pockets or dead spots in the contacting zone. A still further object is to produce substantially instantaneous contact of the jetted materials as a result of the planar dispersion effect produced by impingement of the jetted streams, in which the impact of the jetted streams produces thin films of the jetted materials in a plane perpendicular to the axis of the stream and extending radially therefrom into the body of materials maintained in the contact zone. Where contact is between immiscible materials, the films are finally dispersed as droplets, the material which coalesces most readily, forming a continuous phase in which droplets of the other material will be dispersed.

In a preferred form of the invention, the materials to be contacted are separately introduced into a mixing or contacting zone by way of separate jet discharge conduits, each supplied from a separate source under such conditions as to produce impingement of the streams in a plane intermediate their respective points of introduction. The system as thus employed is particularly adapted to accomplish original contact of the materials, as for example, in an extraction process in which a selective solvent is discharged from one of two opposed jets and a charging stock from the other to effect intimate dispersion and contact of the materials involved. The system is also contemplated for use as in the sweetening of naphthas by contact with a caustic soda solution or with sodium or calcium hypochlorite solutions. The invention is not limited to this particular type of operation, however, and may also be employed where the materials to be mixed or contacted are premixed and discharged into the mixing or contacting zone as pairs of opposed jetted streams supplied from a common source with substantially the same kinetic energy. Although in the system contemplated, the distance between the jet discharge points may be varied, it should be such that the jetted streams of the materials issuing therefrom will impinge one upon the other before their velocity head has been dissipated appreciably. As employed in this description, the term "jet" contemplates an orifice of restricted diameter, relative to a supply conduit means connected thereto, through which a fluid stream is discharged with a pressure drop over the orifice of from 2 to 20 pounds per square inch, and preferably from 6 to 8 pounds per square inch.

In the case of a single jet or orifice discharging into a body of liquid, the frictional effect at the surface of the discharged stream causes a shearing action on both the stream and main body of relatively quiescent liquid into which it is discharged. A relatively high degree of dispersion is thus obtained by the shearing or tearing off of tiny particles from the surface of both the stream and the liquid into which it is discharged. In operation, however, that portion of the main body of liquid adjacent the stream soon acquires a considerable velocity parallel to the stream itself, thereby greatly reducing the shearing tendency. Attempts to further increase this shearing force by employing increased jet velocities have not been successful, and this is believed to be due to the fact that at the higher velocities, the kinetic energy of the moving particles of the stream carries them so far from the point of discharge that they reach a second zone where the stream is expanded and the shearing effect is substantially lost. The use of opposed jets obviates reliance solely on the shearing effect since the impingement of one stream upon another creates a considerable dispersion effect, and produces a zone of intensive agitation in the body of materials surrounding the plane of impingement.

It is contemplated that the invention may have general application not only in the accomplishment of intimate mixtures of miscible materials, but also for effecting finer grained dispersions of immiscible materials, such as in the absorption of olefins from their admixtures with paraffins in sulfuric acid, the selective or non-selective polymerization of olefins, either in substantially pure form or in admixture with paraffin in the presence of sulfuric acid or other catalytic acid, the production of alcohols from olefins or olefin admixtures with paraffins in conjunction with sulfuric acid, and more particularly in the alkylation of isoparaffins with olefins in the presence of a liquid catalyst such as sulfuric acid. As previously mentioned, the invention is also contemplated for employment such as in the treatment of hydrocarbons with caustic solutions for sweetening or removal of lower molecular weight mercaptans, or as in a lead sulfide-sulfur treating process, in the solvent extraction of oils, phenol, sulfur dioxide, and the like. Other equivalent employment and comparable objects of the invention will be suggested and the invention may be more clearly understood from the following description when it is read in conjunction with the accompanying drawings, in which Fig. 1 is a diagrammatic side elevational view of a system according to the invention employed in the caustic washing of gas oil for the removal of aromatic mercaptans;

Fig. 2 is a similar illustration of a system employed for the water extraction of isopropyl alcohol from a mixture thereof in kerosene; and Fig. 3 is a graphic illustration of the efficiency of such a system employed for the extraction of isopropyl alcohol from a mixture thereof with kerosene, using water as a selective solvent, in which the respective materials were discharged as opposed jets into a body of the materials to be contacted, and in which the points of introduction of the respective streams was varied from substantially one to five times the diameter of the jets employed.

Referring to the drawings more specifically, in Fig. 1, the numerals 1 and 2 designate separate contacting vessels employed in a system for the treatment of gas oil for the removal of aromatic mercaptans. The numeral 3 designates an inlet conduit for gas oil extended through one wall of the vessel 1 and terminating therein in a jet discharge nozzle element 3a. The numeral 4 designates an inlet conduit for a caustic solution extended through an opposite wall of the vessel 1 and terminating in a jet discharge nozzle 4a disposed in coaxial, spaced, opposed relation to the nozzle element 3a. As contemplated, it is preferred that the elements 3a and 4a be of similar nature and of equal internal diameter at the outlet thereof. The conduit 3 is connected to any suitable source of supply for the gas oil material, which may be provided from storage or directly from a cracking coil operation. The conduit 4 is connected by way of the line 4b to the discharge of a pump 5. The inlet of pump 5 is connected by line 6 to the lower portion of the vessel 1, providing for circulation of the caustic solution through the vessel 1. A fresh caustic supply line 7 is connected to the inlet line 6, the line 7 being provided with a control valve 7a. A line 8 having a control valve 8a provides for controlled removal of used caustic solution from the system. A discharge line 9 opening from the upper portion of the vessel 1 and having a control valve 9a therein provides for discharge of treated gas oil from the vessel 1. Line 9 is connected to a supply conduit 10 extended through one wall of the vessel 2 and terminating therein in a jet discharge nozzle element 10a and connected therein to a pair of branch lines 10a and 10b, each communicating with similar jet discharge nozzle elements 10c, and arranged so that the outlets of the nozzle elements 10c are disposed in coaxial, opposed, spaced relationship in the vessel 2. A line 11 communicates at one end with the line 10 and at the other end with the outlet of pump 12. The inlet of pump 12 is connected by means of line 13 to the lower portion of the vessel 2 for recirculation of the heavier material of the two materials contacted therein. A line 14 containing control valve 14a provides for the introduction of additional quantities of the material drawn from the vessel 2 by way of line 13. A line 15 connected to the lower portion of the vessel 2 and containing control valve 15a provides for the controlled discharge of the heavier material of those introduced into vessel 2. Line 16 communicating with the upper portion of the vessel 2 provides for the discharge of the lighter of the two materials contacted therein.

In operation, a gas oil such as one having a boiling range of from about 430° F. to about 650° F. is introduced into the vessel 1 by way of the line 3 and the jet discharge nozzle 3a at a temperature of about 130° F. at the rate of about 138 barrels per day, the vessel 1 first having been filled with a caustic soda solution of about 15° Baumé. Simultaneously, the pump 5 is employed to circulate the caustic solution through the lines 6, 4b, 4 and the jet discharge nozzle 4a to discharge a jet stream of caustic solution into the vessel 1 under substantially the same pressure and kinetic energy of the stream of gas oil to line 3 and nozzle 3a, causing the jetted streams of liquids to impinge one upon the other in a plane perpendicular to the axis of the jets. By suitable withdrawal of caustic solution from the vessel 1 by way of line 8, separation of the materials dispersed by the jets is permitted to establish an interfacial level between the treated gas oil and the solution and oil dispersion produced by the jets, in the vessel 1 sufficiently above the level of the jets 3a and 4a to permit separation of the materials introduced below such level and without substantial agitation of the body of materials at the level indicated by the letter $x$. A well defined interface usually will not be established between the dispersed materials and the caustic solution. The heavier caustic and water solution will form the continuous phase in the dispersion with the oil separating therefrom and rising to the upper portion of the vessel 1. At some level in the lower portion of the vessel, however, and below the active zone of agitation in the vicinity of the jets there will be a substantially complete absence of oil particles. Such a level is indicated by dotted lines in the drawing, and designated by $x'$. The gas oil after contact and separation is removed from the vessel 1 by way of the line 9 at substantially the rate of introduction of such material. Spent caustic exhausted by the treating operation is discharged from the vessel 1 by way of line 8 and valve 8a at substantially the rate of 58 gallons per day while fresh caustic solution is added by way of the line 7 and valve 7a at substantially the same rate as removal of the spent caustic material.

The treated gas oil removed from the vessel 1, from below the level $x'$ and by way of line 9 is introduced into the vessel 2 through line 10 at substantially the rate of 138 barrels per day, while adding to the gas oil stream water at substantially the same rate for the purpose of washing residual caustic material from the treated gas oil. Initially, the vessel 2 is filled with water which is recirculated through line 13, pump 12, line 11 and line 10. As gas oil is introduced from the vessel 1, excess water is withdrawn through line 15 by way of valve 15a so as to establish an interfacial level in the upper portion of the vessel 2 as indicated by dotted lines and the letter $y$. The gas oil and water are to some extent premixed in the line 10 prior to discharge into the vessel 2 by way of the branch lines 10a and 10b and the coaxial, opposed, jet elements 10c. As in the step of contacting the gas oil with the caustic soda solution in the vessel 1, the interfacial level $y$ is established at some point above that at which the materials are discharged into the vessel, and sufficiently above such point of discharge so that separation may occur and the interfacial level be established without substantial agitation at that level. Also, as in the operation described with reference to the vessel 1, water which has extracted residual caustic solution from the gas oil introduced by way of line 9 may be continuously removed from the lower portion of vessel 2 by way of line 15 and valve 15a, and from a point below a level such as $y'$ at which dispersed oil particles are no longer present in the water phase of the dispersion. In normal operation, such removal will be accomplished at the rate of approximately 27.6 barrels per day. At the same time, fresh water will be introduced by way of line 14 and valve 14a at an equivalent rate. The treated, washed gas oil will be removed from the vessel 2 by way of the line 16 to a suitable place of storage. Also, as in the contacting of the gas oil with caustic soda solution in vessel 1, the total quantity of water circulated through the vessel 2 is maintained substantially constant to the quantity of gas oil introduced by way of line 9. Thus, with a feed rate of 138 barrels of gas oil per day, vessel 2 will require a feed rate of approximately 138 barrels of water per day including recirculated water and fresh feed water handled by the pump 12. At the respective feed rates employed in each of the vessels 1 and 2, the velocity of the materials through the nozzles 3a and 4a and the nozzles 10c will be approximately 18.3 feet per second. In each of the steps according to the treating operation described, the nozzle elements would have an inside diameter of 0.3 inch and the nozzles would be spaced at 0.75 inch apart.

As another and more specific example of an opposed jet system, according to this invention, reference may be had to one employed for the water extraction of isopropyl alcohol from a mixture thereof in kerosene employing opposed jets, supplied from separate sources, and operating in a pool of the contacted materials in a confined contacting zone, the kerosene-alcohol mixture being introduced through one jet, and water by way of another opposed thereto. In such a system, the degree of extraction is largely dependent upon, and determined by the extent of surface contact between the liquid to be extracted and the selective solvent employed. Turbulence, shearing and dispersion of the materials in the contacting zone is desirable, and the greater the degree of such action, the greater the degree of contact efficiency. The effectiveness of contact is measurable in such a system by the degree of extraction attained.

A suitable apparatus for accomplishing contact according to the present invention, is illustrated by Fig. 2. As shown, the numeral 11 designates a contacting vessel provided with a supply conduit 12 for the kerosene-alcohol mixture. The conduit 12 extends through a vessel wall, and terminates within the vessel in a jet discharge nozzle outlet 12a. A supply conduit 13 for water, as the solvent for the alcohol content in the kerosene-alcohol solution, extends through a wall of the vessel 11 into substantially coaxial, opposed, relationship to the conduit 12, and terminates in a jet nozzle 13a. An outlet line 14 is provided for continuous removal of the materials introduced into the vessel 11, the line 14 leading to a separation zone externally of the vessel 11, and not shown.

In a system such as illustrated by Fig. 2, two jet nozzles, each 0.1 inch in diameter, were disposed so as to discharge in opposition to one another into a contacting zone originally filled with water, the selective solvent for isopropyl alcohol. The nozzles were arranged for variable, coaxially spaced relation, and provision made to measure pressure drop across each nozzle. In the system employed, provisions were also made to vary jet velocities from 0 to 25 ft. per second, the water to kerosene ratio in the system from 0.2:1 to 2.0:1, and the distance between jets was variable from 0.6 to 30 times the diameter of the jets employed.

It was found that the energy required to accomplish a given degree of extraction varied with the distance between jets. This energy was the sum of the kinetic energy of the two streams, and the energy necessary to overcome the pressure drop occasioned by the spacing of the jets. In the operation as conducted, the total energy input was converted to a uniform value of foot pounds per pound of the alcohol-kerosene mixture extracted. With a given flow rate, the kinetic energy of the jetted stream remained constant, but as the jet spacing was reduced to less than 2½ jet port diameters, the energy required to overcome pressure drop increased rapidly. A jet nozzle spacing greater than 2½ port diameters resulted in decreased extraction efficiency for the energy input employed.

The effect of varied jet nozzle spacing on the efficiency of extraction of the isopropyl alcohol from its solution in kerosene, employing water as a selective solvent for the alcohol, is illustrated graphically by Fig. 3 of the drawings. As stated, jet nozzles of 0.1 inch in diameter were employed to bring the alcohol-kerosene solution into contact with water in the contacting chamber originally filled with water at room temperature. The materials were introduced through the jets with a total energy input of about 6 ft. pounds per pound of the alcohol-kerosene solution introduced. Spacing of the jets was varied from between about 0.6 to about 5.5 times the diameter of the jets, and the degree of extraction of alcohol by the water solvent therefor, determined. It was found that the degree of extraction ranged from slightly more than 93% of the total content of isopropyl alcohol in the original mixture, when using jet nozzle spacings of 0.6 jet port diameter, through slightly more than 96% with a jet spacing of 2½ port diameters, to slightly more than 92% of the total content at about 5.5 jet port diameters. As shown by the graphic illustration of Fig. 3, as the jet spacing was reduced from about 5.5 jet port diameters, efficiency improved until it reached a maximum at about 2½ port diameters. Also, as shown, as the jet spacing continued to be reduced below 2½ port diameters, efficiency dropped at a rapid rate. Based on the extraction efficiency as shown by Fig. 3, it may be said that in the employment of coaxial, opposed jets, the spacings of the jets is a critical factor and that when using jets spaced at distances of from 1 to about 5 times the diameter of the jet ports, reasonably efficient extraction results are obtained. Further, it is indicated that for the operation described, the best results were obtained with jet spacings of between about 2 and 3 jet port diameters, and that an optimum was attained in this operation at a spacing of about 2½ jet port diameters. The ratio of jet diameters to the distance between the jets is applicable to jets of any given diameter, but particularly so where applied to jets having a port diameter less than one inch, and preferably in the range of from 0.1 to 0.5 inch. In any specific employment of this invention, however, within the ranges disclosed, the best spacing of the jet outlets will be determined to a large extent by the relationship between the degree of contact obtained and the energy input required.

The invention claimed is:

1. A method for contacting substantially immiscible liquids of different specific gravities, comprising passing a stream of one of said liquids through a confined flow path, injecting a stream of the other of said liquids into said path, substantially combining said liquids as a single stream therein, maintaining a confined dispersion pool of said liquids in an enlarged vertically elongated contacting zone therefor, injecting said single combined stream of liquids into said dispersion pool as a pair of individual, substantially coaxial, opposed, jet streams therefrom with a pressure drop on injection of from 2 to 20 lbs. per square inch, impinging said streams one against another at a distance from their respective points of injection which is not less than 1 times the diameter of said streams at their points of injection, nor more than 4 times said diameter, dispersing the materials of said streams into said dispersion pool at their point of impingement into the surrounding dispersion pool of said materials, separating the lower gravity liquid from the upper portion of said pool and the higher gravity liquid from the lower portion thereof, and separately withdrawing said separated liquids from the contacting zone.

2. A method according to claim 1, in which said pressure drop of the streams upon injection into said dispersion pool is substantially within the range of from about 6 to about 8 lbs. per square inch.

3. A method according to claim 1, in which said substantially immiscible liquids are a liquid hydrocarbon material and an aqueous material and in which said hydrocarbon material is passed as a stream thereof through said confined flow path and the aqueous material is injected as a stream thereof into said flow path.

4. A method for water-washing caustic treated gas oil, the steps which comprise withdrawing caustic treated gas oil from a caustic treating zone, passing said gas oil as a continuous flow stream through a confined flow path therefor, injecting a stream of water into said flow path, substantially combining said caustic treated gas oil and water as a single stream therein, separately maintaining a confined dispersion pool of said gas oil and water in an enlarged vertically elongated contacting zone therefor, injecting said single combined stream of gas oil and water into said dispersion pool as a pair of individual, substantially coaxial, opposed, jet streams thereof with a pressure drop on injecting of from 2 to 20 lbs. per square inch, impinging said paired streams one against another at a distance from their respective points of injection which is not less than 1 times the diameter of said streams at their points of injection, nor more than 4 times said diameter, dispersing said streams at the point of impingement outward therefrom into the surrounding dispersion pool of gas oil and water, separating gas oil from the upper portion of said pool, and water from the lower portion thereof, and separately withdrawing said separated component materials from the contacting zone.

5. An apparatus for contacting substantially immiscible fluid materials, comprising an enlarged, confined contacting chamber, an inlet pipe having an outer end, and an inner end extended into said chamber at an intermediate level therein, a discharge head on the inner end of said pipe interiorly of said chamber, consisting of at least one pair of jet discharge nozzles disposed in coaxially aligned, opposed spaced relation longitudinally of their common axis, said spaced relation providing a spacing between the nozzles not less than 1 times the diameter of the discharge nozzles and not more than 4 times the diameter of said discharge nozzles, and in common communication with the inner end of said inlet pipe, a first conduit supply means for one of said fluid materials connected in conduit communication with the outer end of said inlet pipe, a second conduit supply means for another fluid connected to said inlet pipe intermediate the connection of said first conduit supply means and said discharge head, a first conduit discharge means for withdrawing one of said fluid materials from the contacting chamber after contact with said other fluid therein, communicating with said chamber at a level above said discharge head, a second conduit discharge means for withdrawing the other of said fluid materials from the contacting chamber communicating with said chamber at a level below said discharge head, and conduit means for reintroducing one of said fluid materials into said inlet pipe by way of said second conduit supply means.

References Cited in the file of this patent

UNITED STATES PATENTS

| | | |
|---|---|---|
| 410,067 | Bower | Aug. 27, 1889 |
| 698,953 | Honts | Apr. 29, 1902 |
| 1,394,486 | Foster | Oct. 18, 1921 |
| 1,658,985 | Hessle et al. | Feb. 14, 1928 |
| 1,684,489 | Halloran | Sept. 18, 1928 |
| 1,704,246 | Halloran | Mar. 5, 1929 |
| 1,770,736 | Funk | July 15, 1930 |
| 1,907,455 | Stenzel | May 9, 1933 |
| 2,082,034 | Smith | June 1, 1937 |
| 2,149,574 | Brown | Mar. 7, 1939 |
| 2,150,491 | Cope | Mar. 14, 1939 |
| 2,205,986 | Mangeldorf et al. | June 25, 1940 |
| 2,267,412 | Merwin | Dec. 23, 1941 |
| 2,405,158 | Mensing | Aug. 6, 1946 |
| 2,509,288 | Brochner | May 30, 1950 |

FOREIGN PATENTS

| | | |
|---|---|---|
| 193,979 | Great Britain | Mar. 5, 1923 |
| 269,735 | Switzerland | July 31, 1950 |

OTHER REFERENCES

Chesters: "Chem. and Ind.," pages 448–455, June 16, 1951.